United States Patent
Na

(10) Patent No.: US 9,940,407 B2
(45) Date of Patent: Apr. 10, 2018

(54) METHOD AND APPARATUS FOR PROVIDING COMBINED AUTHENTICATION SERVICE

(71) Applicant: SK Planet Co., Ltd., Seongnam-si, Gyeonggi-do (KR)

(72) Inventor: Seung-Won Na, Seoul (KR)

(73) Assignee: SK PLANET CO., LTD (KR)

( * ) Notice: Subject to any disclaimer, the term of this patent is extended or adjusted under 35 U.S.C. 154(b) by 113 days.

(21) Appl. No.: 14/844,967

(22) Filed: Sep. 3, 2015

(65) Prior Publication Data

US 2016/0078207 A1 Mar. 17, 2016

(30) Foreign Application Priority Data

Sep. 15, 2014 (KR) .......... 10-2014-0122189
Oct. 20, 2014 (KR) .......... 10-2014-0141982

(51) Int. Cl.
*G06F 12/14* (2006.01)
*G06F 17/30* (2006.01)
*G06F 21/36* (2013.01)

(52) U.S. Cl.
CPC ........ *G06F 17/30917* (2013.01); *G06F 21/36* (2013.01)

(58) Field of Classification Search
None
See application file for complete search history.

(56) References Cited

U.S. PATENT DOCUMENTS

| | | | |
|---|---|---|---|
| 8,321,930 B1 * | 11/2012 | Taylor | H04L 63/083 726/16 |
| 9,202,035 B1 * | 12/2015 | Manusov | G06F 21/32 |
| 2009/0244020 A1 * | 10/2009 | Sjolin | G06F 3/04883 345/173 |
| 2012/0194440 A1 * | 8/2012 | Ramrattan | G06F 3/04883 345/173 |
| 2012/0304269 A1 * | 11/2012 | Rodriguez | G06F 3/0488 726/7 |

(Continued)

FOREIGN PATENT DOCUMENTS

JP 2008065365 A 3/2008
KR 1020140011545 A 1/2014

*Primary Examiner* — Fatoumata Traore
(74) *Attorney, Agent, or Firm* — Fish & Richardson P.C.

(57) ABSTRACT

Disclosed herein are a method and apparatus for providing a combined authentication service. Combined authentication information is set by acquiring an entry window location and authentication characters from a user, an entry window including the entry keypad is displayed at the entry window location, entry information including entry characters and entry coordinates is acquired from the user via the entry window, and combined authentication is performed by verifying the entry characters and the entry coordinates, thus strengthening the security of authentication of a mobile terminal while maintaining the user's existing password. Further, if a region to which the password entry coordinates are to be mapped is selected when the user sets a password, authentication is performed by additionally considering mapping coordinates in addition to the password even if the user enters the password into the existing password entry window, thus strengthening the security of password authentication.

11 Claims, 14 Drawing Sheets

(56) References Cited

U.S. PATENT DOCUMENTS

| | | | |
|---|---|---|---|
| 2013/0086666 A1* | 4/2013 | Cheng | G06F 21/32 |
| | | | 726/7 |
| 2013/0219490 A1* | 8/2013 | Isbister | G06F 21/32 |
| | | | 726/19 |
| 2014/0143859 A1 | 5/2014 | Linge et al. | |

* cited by examiner

METHOD AND APPARATUS FOR PROVIDING COMBINED AUTHENTICATION SERVICE

CROSS REFERENCE TO RELATED APPLICATIONS

This application claims the benefit of Korean Patent Application Nos. 10-2014-0122189, filed Sep. 15, 2014 and 10-2014-0141982, filed Oct. 20, 2014, which are hereby incorporated by reference in their entirety into this application.

BACKGROUND OF THE INVENTION

1. Technical Field

The present invention generally relates to a method and apparatus for providing a combined authentication service and, more particularly, to a method and apparatus for providing a combined authentication service, which are configured such that, when a user selects the location of a password entry window, and enters his or her password into the entry window at the selected location, authentication is performed by considering entry coordinates and an input pattern, and such that, when the user selects a region to which password entry coordinates are to be mapped, authentication is performed by additionally considering mapping coordinates in addition to the password even if the user enters the password into an existing password entry window.

2. Description of the Related Art

Generally, a password authentication system in mobile terminals is problematic in that the exposure of a password is directly related to the problem of security. Further, when the setting of a complicated password is required so as to strengthen security, a problem arises in that a user is forced to additionally memorize a separate password in addition to his or her existing password that is usually used, thus resulting in inconvenience.

Therefore, when the user selects the location of a password entry window and enters his or her password into the entry window at the selected location, a password input pattern is set, and authentication is performed in consideration of entered numbers, entry coordinates, and an input pattern upon entering the password, thus allowing the user to maintain his or her existing password without change. Further, when the user selects a region to which password entry coordinates are to be mapped upon setting the password, authentication is performed in consideration of the region to be mapped and the entered password, thus strengthening security while allowing the user to maintain his or her existing password and existing password entry window without change. Therefore, authentication technology related to this process is urgently required.

In connection with this, Korean Patent Application Publication No. 10-2014-0011545 discloses a technology related to "Method for Inputting Data and Apparatus thereof."

SUMMARY OF THE INVENTION

Accordingly, the present invention has been made keeping in mind the above problems occurring in the prior art, and an object of the present invention is to provide a security-strengthened authentication service while allowing a user to maintains his or her existing password without change, by performing authentication in consideration of entered numbers and entry coordinates when the user selects the location of a password entry window and enters his or her password into the entry window at the selected location.

Another object of the present invention is to provide a security-strengthened authentication service while allowing a user to maintain his or her existing password and existing password entry window without change, by performing authentication in consideration of a region to be mapped and an entered password when the user selects a region to which password entry coordinates are to be mapped upon setting the password.

A further object of the present invention is to provide a security-strengthened authentication service while allowing a user to maintain his or her existing password without change, by additionally acquiring either a password input pattern or a password input pattern and fingerprint information when the user sets a password and by performing authentication in consideration of the additionally acquired information.

In accordance with an aspect of the present invention to accomplish the above objects, there is provided a method for providing a combined authentication service, including setting combined authentication information by acquiring an entry window location and authentication characters from a user; displaying an entry window including an entry keypad at the entry window location and acquiring entry information including entry characters and entry coordinates from the user via the entry window; and performing combined authentication by verifying the entry characters and the entry coordinates.

Setting the combined authentication information may include verifying whether the entry characters match authentication characters contained in the combined authentication information; and calculating an entry range in which the user makes an entry based on the entry coordinates, and verifying whether the entry range corresponds to the entry window location.

Setting the combined authentication information may be configured to additionally acquire an input pattern of the authentication characters as an authentication pattern, acquiring the entry information may be configured to additionally acquire an input pattern of the entry characters as an input pattern, and performing the combined authentication may further include verifying whether similarity between the input pattern and the authentication pattern falls within a preset similarity range.

Setting the combined authentication information may be configured to, when the user selects one from among preset entry window location types, acquire the entry window location depending on the selected type.

When the authentication characters are acquired, the authentication pattern may include times of entry of respective characters by the user, and when the entry characters are acquired, the input pattern may include times of entry of respective characters by the user.

The input pattern may include time intervals between the entry times.

In accordance with another aspect of the present invention to accomplish the above objects, there is provided an apparatus for providing a combined authentication service, including a combined authentication information setting unit for setting combined authentication information by acquiring an entry window location and authentication characters from a user; a user interface unit for displaying an entry window including an entry keypad at the entry window location and acquiring entry information including entry characters and entry coordinates from the user via the entry window; and a combined authentication performance unit for performing combined authentication by verifying the entry characters and the entry coordinates.

The combined authentication performance unit may include a character verification unit for verifying whether the entry characters match authentication characters contained in the combined authentication information; and a coordinate verification unit for calculating an entry range in which the user makes an entry based on the entry coordinates, and verifying whether the entry range corresponds to the entry window location.

The combined authentication information setting unit may additionally acquire an input pattern of the authentication characters as an authentication pattern, the user interface unit may additionally acquire an input pattern of the entry characters as an input pattern, and the combined authentication performance unit may further include a pattern verification unit for verifying whether similarity between the input pattern and the authentication pattern falls within a preset similarity range.

The combined authentication information setting unit may be configured to, when the user selects one from among preset entry window location types, acquire the entry window location depending on the selected type.

When the authentication characters are acquired, the authentication pattern may include times of entry of respective characters by the user, and when the entry characters are acquired, the input pattern may include times of entry of respective characters by the user.

The input pattern may include time intervals between the entry times.

In accordance with a further aspect of the present invention to accomplish the above objects, there is provided an apparatus for providing a combined authentication service, including a combined authentication information setting unit for acquiring a coordinate mapping layer region as a region separate from a character entry region including a character entry keypad when a user makes a region setting entry, acquiring reference characters and reference coordinates via the character entry region when the user makes a character setting entry, and calculating reference mapping coordinates by mapping the reference coordinates to the coordinate mapping layer region, thus setting combined authentication information; an authentication target information acquisition unit for acquiring authentication target characters and authentication target coordinates via the character entry region when the user makes an authentication entry; and a combined authentication performance unit for calculating authentication target mapping coordinates by mapping the authentication target coordinates to the coordinate mapping layer region, and for verifying the authentication target characters and the authentication target mapping coordinates, thus performing combined authentication.

The combined authentication performance unit may include a character verification unit for verifying whether the authentication target characters match the reference characters; and a coordinate verification unit for verifying whether the authentication target mapping coordinates fall within a preset distance range from the reference mapping coordinates.

The combined authentication information setting unit may generate a mapping relationship so that coordinates in the coordinate mapping layer region are mapped in a one-to-one mapping manner to coordinates in the character entry region, and map the reference coordinates depending on the mapping relationship, and the combined authentication performance unit may map the authentication target coordinates depending on the mapping relationship.

The combined authentication information setting unit may additionally acquire a reference input pattern when the user makes a character setting entry, the authentication target information acquisition unit may additionally acquire an authentication target input pattern when the user makes an authentication entry, and the combined authentication performance unit may further include a pattern verification unit for verifying whether similarity between the reference input pattern and the authentication target input pattern falls within a preset similarity range.

The combined authentication information setting unit may be configured to, when the user selects one from among preset coordinate mapping layer region types, acquire the coordinate mapping layer region depending on the selected type.

The reference input pattern and the authentication target input pattern may include entry times of the reference characters when the user makes a character setting entry, and entry times of the authentication target characters when the user makes an authentication entry, respectively.

The reference input pattern may include one of time intervals between the entry times of the reference characters and a ratio of the time intervals.

The combined authentication information setting unit may additionally acquire reference fingerprint information of the user when the user makes a character setting entry, the authentication target information acquisition unit may additionally acquire authentication target fingerprint information of the user when the user makes an authentication entry, and the combined authentication performance unit may further include a fingerprint verification unit for verifying whether similarity between the reference fingerprint information and the authentication target fingerprint information falls within a preset similarity range.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
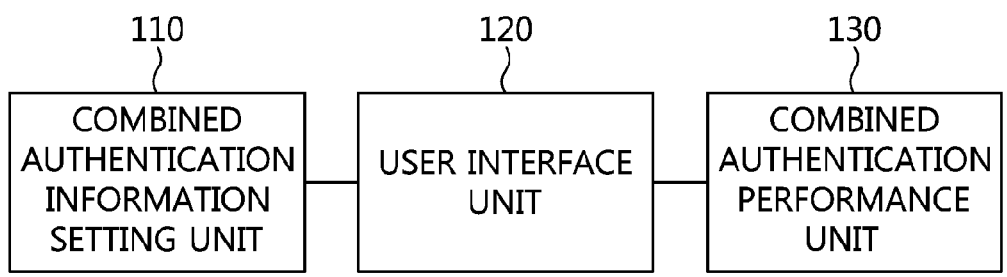
FIG. 1 is a block diagram showing an apparatus for providing a combined authentication service according to an embodiment of the present invention.

Hereinafter, preferred embodiments of the present invention will be described in detail with reference to the attached drawings. In the following description of the present invention and attached drawings, detailed descriptions of known functions and configurations which are deemed to make the gist of the present invention obscure will be omitted. It should be noted that the same reference numerals are used to designate the same or similar elements throughout the drawings.

The terms and words used in the present specification and claims should not be interpreted as being limited to their typical meaning based on the dictionary definitions thereof, but should be interpreted as having the meaning and concept relevant to the technical spirit of the present invention, on the basis of the principle by which the inventor can suitably define the implications of terms in the way which best describes the invention. Meanwhile, the configurations described in the present specification and the configurations illustrated in the drawings are merely preferred embodiments of the present invention and do not exhaustively present the technical spirit of the present invention. Accordingly, it should be appreciated that there may be various equivalents and modifications that can replace the embodiments and the configurations at the time at which the present application is filed. The terms such as "first" and "second" may be used to describe various components and are intended to merely distinguish one component from other components and are not intended to limit the components.

FIG. 1 is a block diagram showing an apparatus for providing a combined authentication service according to an embodiment of the present invention.

Referring to FIG. 1, the apparatus for providing a combined authentication service according to the embodiment of the present invention includes a combined authentication information setting unit 110, a user interface unit 120, and a combined authentication performance unit 130.

The combined authentication information setting unit 110 sets combined authentication information by acquiring an entry window location and authentication characters (including numbers) from a user.

Here, the combined authentication information setting unit 110 is configured to, when the user selects any one from among preset entry window location types, acquire an entry window location depending on the selected type.

The user may select any one from among entry window location types displayed on the display of his or her terminal device.

The combined authentication information setting unit 110 may acquire the entry window location corresponding to the type selected by the user and set combined authentication information containing the acquired entry window location.

For example, when the user selects one type, the combined authentication information setting unit 110 of the apparatus for providing a combined authentication service according to the present invention may acquire, as the entry window location, a region specified based on base lines (0%) corresponding to the left and top edges of the display so that the region conforms to the corresponding type.

Further, the combined authentication information setting unit 110 is configured to, when one type is displayed and the user moves the location of the type, acquire the entry window location based on the results of movement, and set combined authentication information containing the acquired entry window location.

In this case, the combined authentication information setting unit 110 may additionally acquire an input pattern of authentication characters as an authentication pattern.

The authentication pattern may include the entry times at which the user entered respective characters when the authentication characters are acquired.

The authentication pattern may include time intervals between the entry times.

The authentication pattern may be the ratio of the time intervals between the entry times.

The user interface unit 120 displays an entry window including an entry keypad at the entry window location, and acquires the entry information including entry characters (including numbers) and entry coordinates from the user via the entry window.

Here, the user interface unit 120 may additionally acquire a pattern in which the entry characters are entered as an input pattern.

The user interface unit 120 may further display whether each character has been entered.

The user interface unit 120 may display whether each character has been entered in consideration of the ratio of the time intervals between the entry times of the characters.

The input pattern may include the entry times at which the user entered respective characters when the entry characters are acquired.

The input pattern may include the time intervals between the entry times.

The input pattern may be the ratio of the time intervals between the entry times.

In this case, the user interface unit 120 may further display an entry state indication line for indicating whether each character has been entered.

On the entry state indication line, one or more entry marks may be arranged so as to indicate the number of entered characters and the intervals between the entry times of the characters whenever the user enters each character.

For example, when the user enters numbers in the sequence of 6, 4, 8, and 1, an entry mark is generated on the entry state indication line whenever the user enters each number, and thus a total of four entry marks may be arranged.

Here, when the user enters numbers of 6, 4, 8, and 1 at regular time intervals, the arrangement intervals between the entry marks may be uniform.

Further, when the user enters numbers in the sequence of 6, 4, 8, and 1, and shortens a time interval between the entry times of 4 and 8, the arrangement interval between the entry marks of 4 and 8 may be shorter than that of other entry marks.

For example, when the user enters numbers in the sequence of 6, 4, 8, and 1 at times of 0 ms (base value), 300 ms, 400 ms, and 600 ms, respectively, the ratio of the arrangement intervals between the entry marks may be 3:1:2 depending on the ratio of entry time intervals.

Here, the user interface unit 120 may display signals to the user and receive input signals from the user, using a touch screen or a touch panel.

The entry tool of the user may include one or more of the user's finger and a stylus pen.

The combined authentication performance unit 130 performs combined authentication by verifying the entry characters and the entry coordinates.

Here, the combined authentication performance unit 130 may includes a character verification unit for verifying whether the entry characters match the authentication characters contained in the combined authentication information; and a coordinate verification unit for calculating an entry range in which the user makes an entry, based on the entry coordinates, and verifying whether the entry range corresponds to the entry window location.

Here, the combined authentication performance unit 130 may further include a pattern verification unit for verifying whether similarity between the input pattern and the authentication pattern falls within a preset similarity range.

Figure 2:
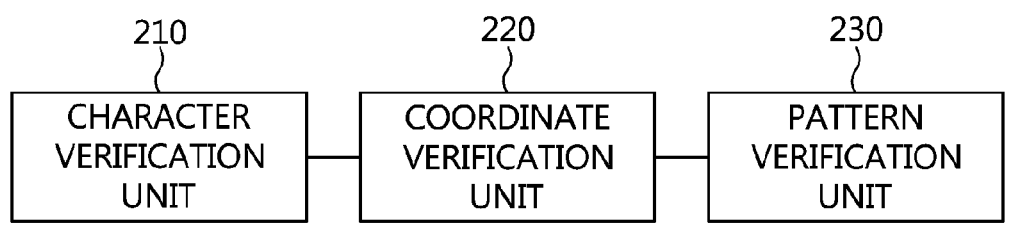
FIG. 2 is a block diagram showing an example of a combined authentication performance unit shown in FIG. 1.

FIG. 2 is a block diagram showing an example of the combined authentication performance unit 130 shown in FIG. 1.

Referring to FIG. 2, the combined authentication performance unit 130 shown in FIG. 1 includes a character verification unit 210, a coordinate verification unit 220, and a pattern verification unit 230.

The character verification unit 210 verifies whether entry characters match authentication characters contained in combined authentication information.

The coordinate verification unit 220 calculates an entry range in which the user makes an entry, based on the entry coordinates, and verifies whether the entry range corresponds to the entry window location.

The pattern verification unit 230 verifies whether the similarity between the input pattern and the authentication pattern falls within a preset similarity range.

Here, the combined authentication performance unit 130 shown in FIG. 1 may determine that combined authentication has succeeded when all of character verification, coordinate verification, and pattern verification are successful.

The combined authentication performance unit 130 shown in FIG. 1 may determine that combined authentication has failed if any one of character verification, coordinate verification, and pattern verification is not successful.

Figure 3:
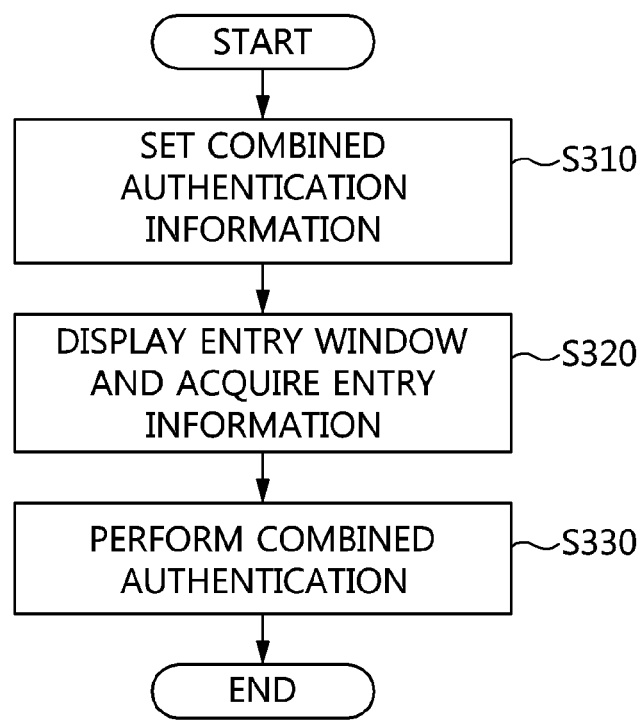
FIG. 3 is an operation flowchart showing a method for providing a combined authentication service according to an embodiment of the present invention.

FIG. 3 is an operation flowchart showing a method for providing a combined authentication service according to an embodiment of the present invention.

Referring to FIG. 3, the method for providing a combined authentication service according to the embodiment of the present invention acquires an entry window location and authentication characters from a user and then sets combined authentication information at step S310.

At step S310, when the user selects any one from among preset entry window location types, the entry window location may be acquired depending on the selected type.

The user may select any one from among the entry window location types displayed on the display of his or her terminal device.

Here, at step S310, the entry window location corresponding to the type selected by the user may be acquired, and combined authentication information containing the entry window location may be set.

For example, at step S310, when the user selects any one type, the apparatus for providing a combined authentication service according to the present invention may acquire, as the entry window location, a region specified based on base lines (0%) corresponding to the left and top edges of the display so that the region conforms to the corresponding type.

Furthermore, at step S310, when any one type is displayed and the user moves the location of the type, the entry window location based on the results of movement is acquired, and combined authentication information containing the entry window location may be set.

Here, at step S310, an input pattern of authentication characters may be additionally acquired as an authentication pattern.

Here, the authentication pattern may include the times of entry of respective characters by the user when the authentication characters are acquired.

The authentication pattern may include time intervals between the entry times.

The authentication pattern may be the ratio of the time intervals between the entry times.

Further, the method for providing a combined authentication service according to the embodiment of the present invention displays an entry window including an entry keypad at the entry window location, and acquires entry information including entry characters and entry coordinates from the user via the entry window at step S320.

At step S320, the pattern in which the entry characters are entered may be additionally acquired as an input pattern.

Here, at step S320, whether each character has been entered may be further displayed.

At step S320, whether each character has been entered may be displayed in consideration of the ratio of the time intervals between the entry times of the characters.

The input pattern may include the times of entry of the respective characters by the user when the entry characters are acquired.

The input pattern may include time intervals between the entry times.

The input pattern may be the ratio of the time intervals between the entry times.

At step 320, an entry state indication line may be further displayed to indicate whether each character has been entered.

Here, on the entry state indication line, one or more entry marks may be arranged to indicate the number of entered characters and the intervals between the entry times of the characters whenever the user enters each character.

For example, when the user enters numbers in the sequence of 6, 4, 8, and 1, an entry mark is generated on the entry state indication line whenever the user enters each number, and thus a total of four entry marks may be arranged.

Here, when the user enters numbers of 6, 4, 8, and 1 at regular time intervals, the arrangement intervals between the entry marks may be uniform.

Further, when the user enters numbers in the sequence of 6, 4, 8, and 1, and shortens a time interval between the entry times of 4 and 8, the arrangement interval between the entry marks of 4 and 8 may be shorter than that of other entry marks.

For example, when the user enters numbers in the sequence of 6, 4, 8, and 1 at times of 0 ms (base value), 300 ms, 400 ms, and 600 ms, respectively, the ratio of the arrangement intervals between the entry marks may be 3:1:2 depending on the ratio of entry time intervals.

Further, the method for providing a combined authentication service according to the embodiment of the present invention verifies the entry characters and entry coordinates, and thus performs combined authentication at step S330.

Here, step S330 may include the step of verifying whether the entry characters match authentication characters contained in combined authentication information; and the step of calculating an entry range in which the user makes an entry, based on the entry coordinates, and verifying whether the entry range corresponds to the entry window location.

Here, step S330 may further include the step of verifying whether similarity between the input pattern and the authentication pattern falls within a preset similarity range.

Figure 4:
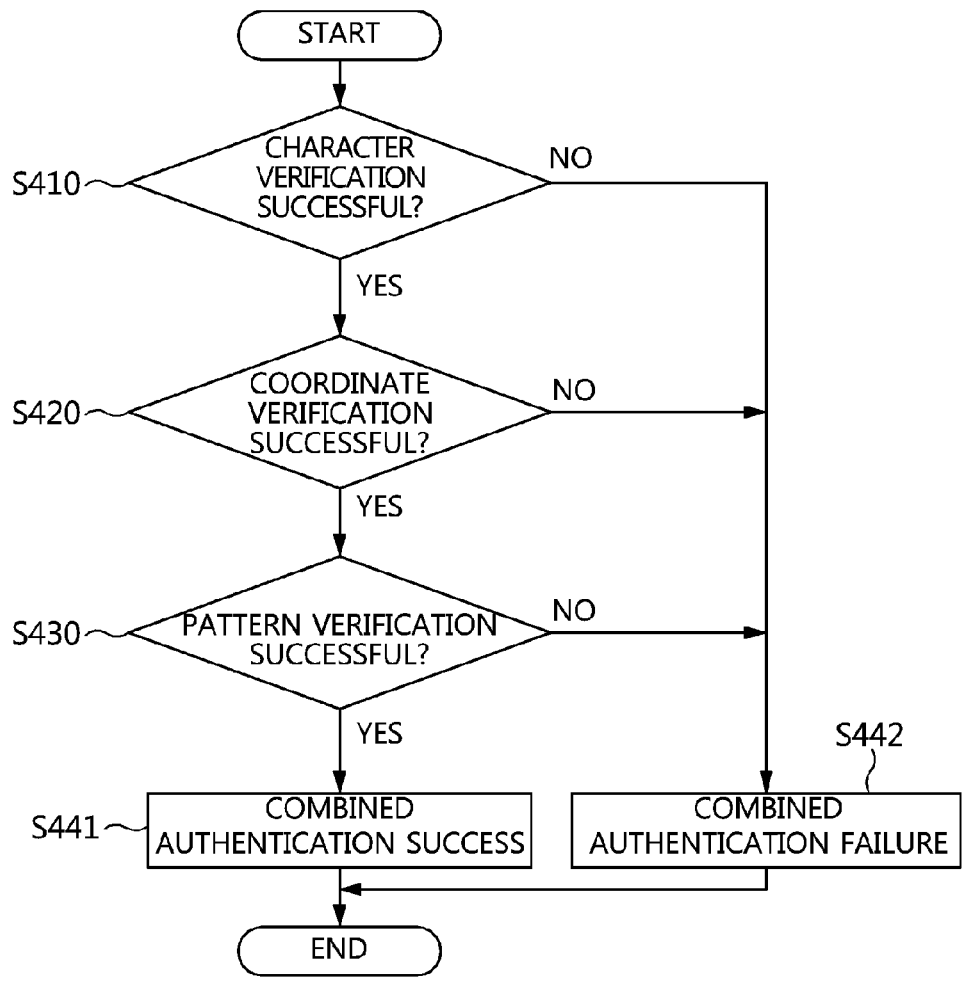
FIG. 4 is an operation flowchart showing an example of a combined authentication performance step according to the present invention.

FIG. 4 is an operation flowchart showing an example of the combined authentication performance step S330 according to the present invention.

Referring to FIG. 4, the combined authentication performance step S330 according to the present invention is configured to verify whether the entry characters match the authentication characters contained in the combined authentication information at step S410.

If it is determined at step S410 that the entry characters match the authentication characters, the combined authentication performance step S330 proceeds to step S420.

Further, the combined authentication performance step S330 according to the present invention is configured to calculate the entry range in which the user makes an entry based on the entry coordinates, and verify whether the entry range corresponds to the entry window location at step S420.

If it is determined at step S420 that the entry range corresponds to the entry window location, the combined authentication performance step S330 according to the present invention proceeds to step S430.

Further, the combined authentication performance step S330 according to the present invention is configured to verify whether the similarity between the input pattern and the authentication pattern falls within a preset similarity range at step S430.

If it is determined at step S430 that the similarity between the input pattern and the authentication pattern falls within the preset similarity range, the combined authentication performance step S330 according to the present invention is configured to determine that combined authentication has succeeded at step S441.

As a result of steps S410, S420, or S430, if the entry characters do not match the authentication characters, if the entry range does not correspond to the entry window location, or if the similarity between the input pattern and the authentication pattern does not fall within the preset similarity range, the combined authentication performance step S330 according to the present invention is configured to determine that combined authentication has failed at step S442.

The method for providing a combined authentication service according to the present invention may be implemented as a program or a smartphone app that can be executed by various computer means. In this case, the program or smartphone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, for example, magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Figure 5:
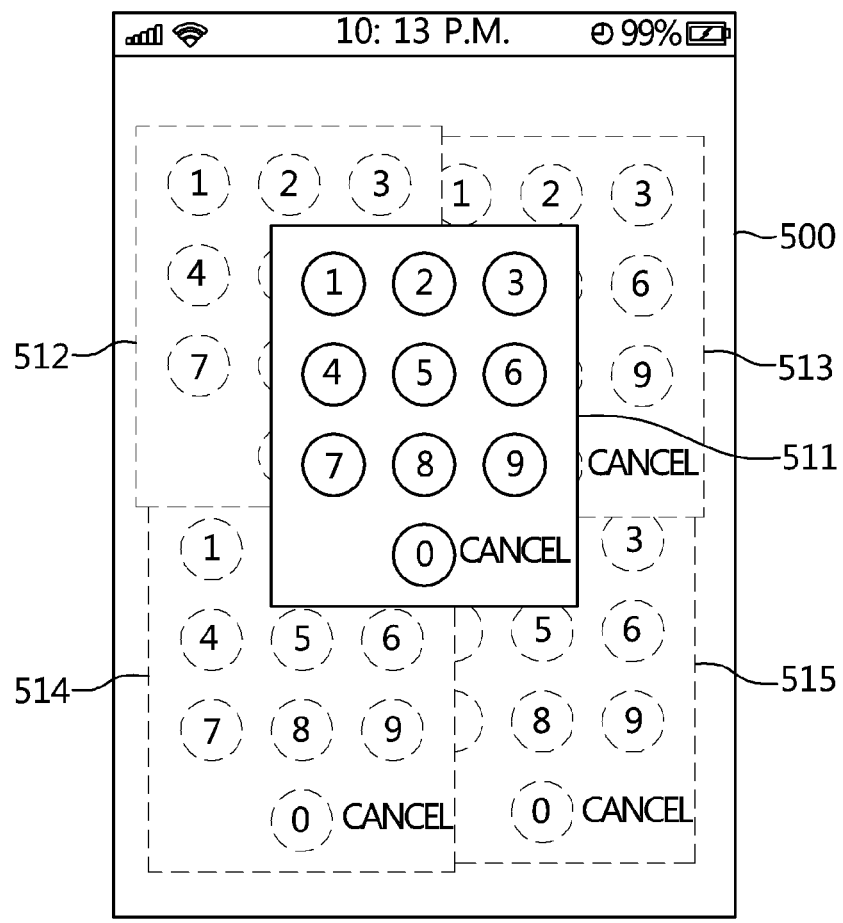
FIG. 5 is a diagram showing an example of an interface screen according to an embodiment of the present invention.

FIG. 5 is a diagram showing an example of an interface screen according to an embodiment of the present invention.

In particular, the interface screen of FIG. 5 is a screen on which the user selects any one from among preset entry window location types and then sets an entry window location.

Referring to FIG. 5, the apparatus for providing a combined authentication service according to the present invention displays preset entry window location types to the user.

Here, the user may select any one from among entry window location types 511 to 515 displayed on the display 500 of his or her terminal device.

The apparatus for providing a combined authentication service according to the present invention may acquire the entry window location corresponding to the type selected by the user and set combined authentication information containing the entry window location.

For example, when the user selects the type 515, the apparatus for providing a combined authentication service according to the present invention may set, as the entry window location, a region located rightwards by 40%~100% from a left edge (0%) and downwards by 40%~100% from an top edge (0%) on the display 500 so that the region conforms to the type 515.

Although not shown in FIG. 5, the apparatus for providing a combined authentication service according to the present invention is configured to, when one type 511 is displayed and the user moves the location of the type 511, acquire the entry window location based on the results of movement, and set combined authentication information containing the entry window location.

For example, when the region of the type 511 is configured to be located rightwards by 20%~80% from the left edge (0%) and downwards by 20%~80% from the top edge (0%), and the user moves the region of the type 511 rightwards by 10%, the region located rightwards by 10%~90% from the left edge (0%) and downwards by 20%~80% from the top edge (0%) on the display 500 may be acquired as the entry window location so as to conform to the results of movement.

Figure 6:
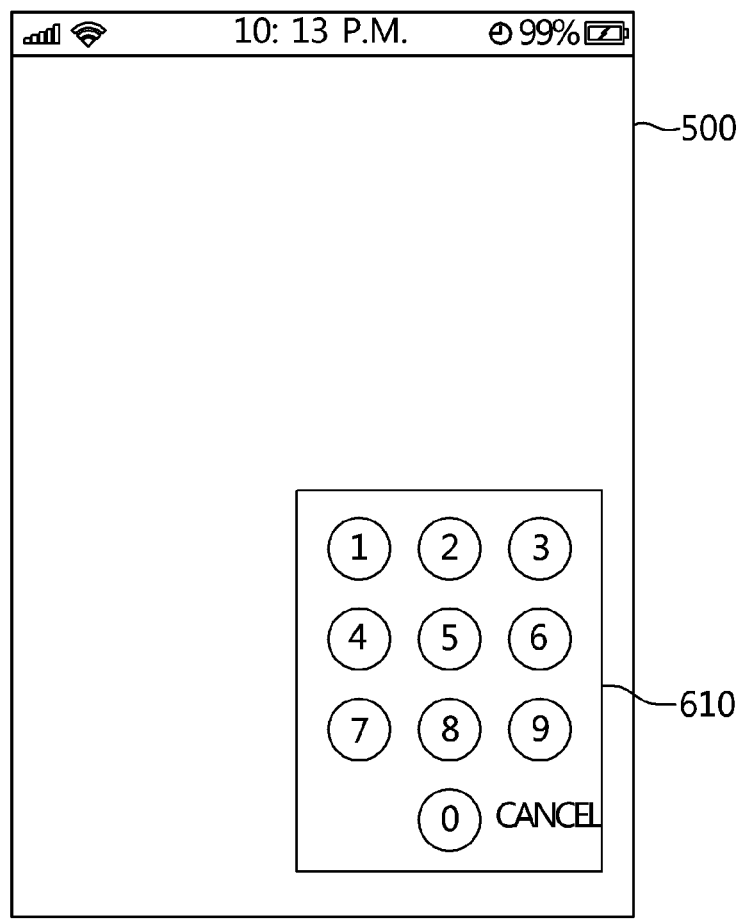
FIG. 6 is a diagram showing another example of the interface screen according to the embodiment of the present invention.

FIG. 6 is a diagram showing another example of the interface screen according to the embodiment of the present invention.

In particular, the interface screen of FIG. 6 is a waiting screen for performing authentication after the setting of combined authentication information has been completed.

Referring to FIG. 6, the apparatus for providing a combined authentication service according to the present invention displays an entry window 610 including an entry keypad on the display 500 of the terminal device depending on the entry window location contained in combined authentication information.

Further, the apparatus for providing a combined authentication service according to the present invention displays an entry state indication line for indicating whether each character has been entered.

Here, on the entry state indication line, one or more entry marks may be arranged to indicate the number of entered characters and the time intervals between the entry times of the characters whenever the user enters each character.

Figure 7:
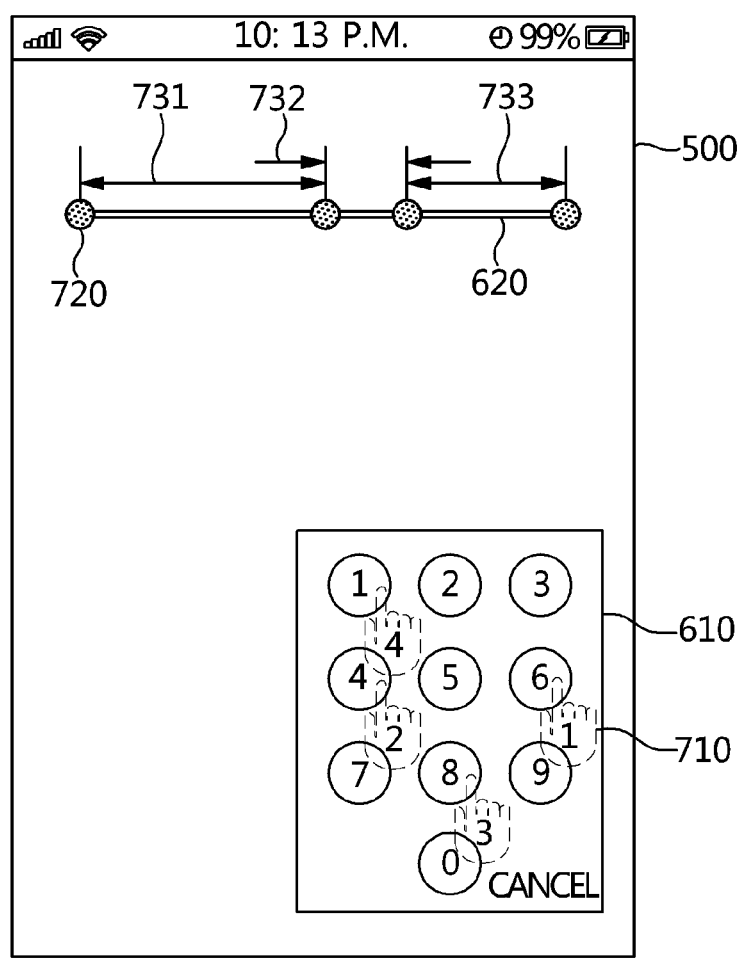
FIG. 7 is a diagram showing a further example of the interface screen according to the embodiment of the present invention.

FIG. 7 is a diagram showing a further example of the interface screen according to the embodiment of the present invention.

In particular, the interface screen of FIG. 7 is a screen, on which time intervals between entry times based on the user's entry are displayed, using the arrangement intervals between entry marks 720.

Referring to FIG. 7, when the user enters characters using an entry tool 710, entry marks 720 are arranged on an entry state indication line 620 in consideration of the time intervals between the entry times of the characters.

For example, when the user enters numbers in the sequence of 6, 4, 8, and 1, entry marks 720 are generated on the entry state indication line 620 whenever respective numbers are entered, and thus a total of four entry marks 720 are arranged.

Here, when the user enters numbers 6, 4, 8, and 1 at regular time intervals, arrangement intervals 731 to 733 between the entry marks 720 are uniform.

When the user shortens the time interval between the entry times of 4 and 8 while entering numbers in the sequence of 6, 4, 8, and 1, the arrangement interval 732 between the entry marks corresponding to 4 and 8 becomes shorter than the arrangement intervals 731 and 733 between other entry marks.

For example, when the user sequentially enters numbers of 6, 4, 8, and 1 at times of 0 ms (base value), 300 ms, 400 ms, and 600 ms, respectively, the arrangement intervals 731 to 733 between entry marks may have a ratio of 3:1:2 depending on the ratio of the intervals between the entry times.

In this way, the ratio of the entry time intervals may be displayed by means of the arrangement intervals between the entry marks, thus allowing the user to intuitively display the shape of the pattern.

Figure 8:
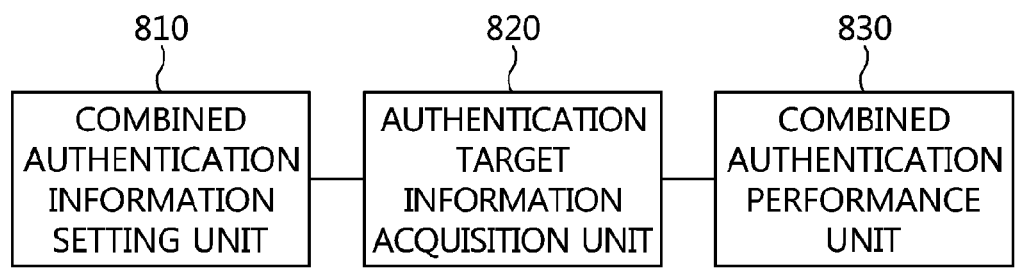
FIG. 8 is a block diagram showing an apparatus for providing a combined authentication service according to another embodiment of the present invention.

FIG. 8 is a block diagram showing an apparatus for providing a combined authentication service according to another embodiment of the present invention.

Referring to FIG. 8, the apparatus for providing a combined authentication service according to the embodiment of the present invention includes a combined authentication information setting unit 810, an authentication target information acquisition unit 820, and a combined authentication performance unit 830.

The combined authentication information setting unit 810 acquires a coordinate mapping layer region, reference characters, and reference coordinates from a user's entry and then sets combined authentication information.

Here, the combined authentication information may include one or more of a coordinate mapping layer region, reference characters, reference coordinates, and reference mapping coordinates.

The combined authentication information setting unit 810 may acquire a coordinate mapping layer region as a region separate from a character entry region including a character entry keypad via the user's region setting entry.

Further, the combined authentication information setting unit 810 may acquire reference characters and reference coordinates via the character entry region when the user makes a character setting entry, and calculate reference mapping coordinates by mapping the reference coordinates to the coordinate mapping layer region.

The combined authentication information setting unit 810 generates a mapping relationship so that coordinates in the coordinate mapping layer region are mapped in a one-to-one mapping manner to coordinates in the character entry region, and maps the reference coordinates depending on the mapping relationship.

Here, when the user selects any one from among preset coordinate mapping layer region types, the combined authentication information setting unit 810 may acquire a coordinate mapping layer region depending on the selected type.

In this case, the user may select any one from among the coordinate mapping layer region types displayed on the display of his or her terminal device.

For example, when the user selects any one type, the combined authentication information setting unit 810 of the apparatus for providing a combined authentication service according to the present invention may acquire, as the coordinate mapping layer, a region specified based on base lines (0%) corresponding to the left and top edges of the display region so that the region conforms to the corresponding type.

As another method of acquiring the coordinate mapping layer region in the combined authentication information setting unit 810, when one type is displayed and the user moves the region of the type, the combined authentication information setting unit 810 may acquire a coordinate mapping layer region based on the results of movement.

As a further method of acquiring the coordinate mapping layer region in the combined authentication information setting unit 810, when one type is displayed and the user adjusts the size of the region of the type, the combined authentication information setting unit 810 may acquire a size-adjusted coordinate mapping layer region.

Here, the combined authentication information setting unit 810 may additionally acquire a reference input pattern when the user makes a character setting entry.

The reference input pattern may include the entry times of respective reference characters when the user makes a character setting entry.

The reference input pattern may include the time intervals between the entry times of the reference characters.

The reference input pattern may be the ratio of the time intervals between the entry times of the reference characters.

In addition, the combined authentication information setting unit 810 may additionally acquire reference fingerprint information of the user when the user makes a character setting entry.

The authentication target information acquisition unit 820 acquires authentication target characters and authentication target coordinates, which are to be authenticated, via the character entry region, when the user makes an authentication entry.

Here, the authentication target information acquisition unit 820 may additionally acquire an authentication target input pattern when the user makes an authentication entry.

The authentication target input pattern may include the entry times of the authentication target characters when the user makes an authentication entry.

The authentication target input pattern may include the time intervals between the entry times of the authentication target characters.

The authentication target input pattern may be the ratio of the time intervals between the entry times of the authentication target characters.

Also, the authentication target information acquisition unit 820 may additionally acquire the authentication target fingerprint information of the user when the user makes an authentication entry.

Here, the apparatus for providing a combined authentication service according to the embodiment of the present invention may display an entry state indication line for indicating whether each character has been entered on the display of the terminal device.

In this case, on the entry state indication line, one or more entry marks may be arranged so as to indicate the number of entered characters and the intervals between the entry times of the characters whenever the user enters each character.

For example, when the user enters numbers in the sequence of 6, 4, 8, and 1, an entry mark is generated on the entry state indication line whenever the user enters each number, and thus a total of four entry marks may be arranged.

Here, when the user enters numbers of 6, 4, 8, and 1 at regular time intervals, the arrangement intervals between the entry marks may be uniform.

Further, when the user enters numbers in the sequence of 6, 4, 8, and 1, and shortens a time interval between the entry times of 4 and 8, the arrangement interval between the entry marks of 4 and 8 may be shorter than that of other entry marks.

For example, when the user enters numbers in the sequence of 6, 4, 8, and 1 at times of 0 ms (base value), 300 ms, 400 ms, and 600 ms, respectively, the ratio of the arrangement intervals between the entry marks may be 3:1:2 depending on the ratio of entry time intervals.

In this case, the apparatus for providing a combined authentication service according to the embodiment of the present invention may display signals to the user and receive entry signals from the user, using a touch screen or a touch panel.

The user's entry tool may include one or more of the user's finger and a stylus pen.

The combined authentication performance unit 830 performs combined authentication by verifying authentication target characters and authentication target mapping coordinates.

The combined authentication performance unit 830 may calculate authentication target mapping coordinates by mapping the authentication target coordinates to the coordinate mapping layer region.

Here, the combined authentication performance unit 830 may map the authentication target coordinates using a mapping relationship generated such that coordinates in the coordinate mapping layer region are mapped in a one-to-one mapping manner to coordinates in the character entry region.

In this case, the combined authentication performance unit 830 may include a character verification unit for verifying whether the authentication target characters match the reference characters contained in the combined authentication information.

The combined authentication performance unit 830 may further include a coordinate verification unit for verifying whether the authentication target mapping coordinates fall within a preset distance range from the reference mapping coordinates.

The combined authentication performance unit 830 may further include a pattern verification unit for verifying whether similarity between the reference input pattern and the authentication target input pattern falls within a preset similarity range.

The combined authentication performance unit 830 may further include a fingerprint verification unit for verifying whether similarity between reference fingerprint information and authentication target fingerprint information falls within a preset similarity range.

Figure 9:
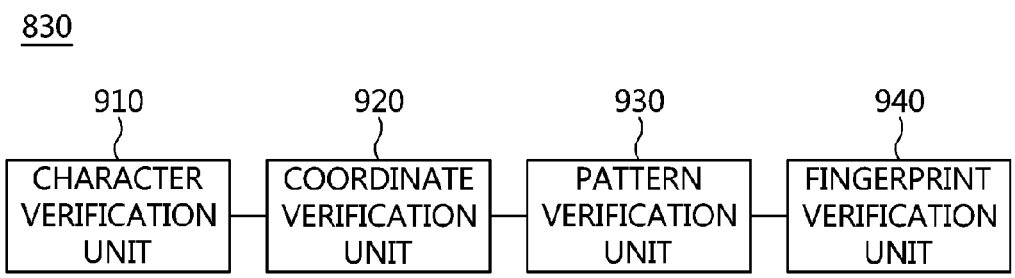
FIG. 9 is a block diagram showing an example of a combined authentication performance unit shown in FIG. 8.

FIG. 9 is a block diagram showing an example of the combined authentication performance unit 830 shown in FIG. 8.

Referring to FIG. 9, the combined authentication performance unit 830 shown in FIG. 8 includes a character verification unit 910, a coordinate verification unit 920, a pattern verification unit 930, and a fingerprint verification unit 940.

The character verification unit 910 verifies whether authentication target characters match reference characters contained in combined authentication information.

The coordinate verification unit 920 verifies whether authentication target mapping coordinates fall within a preset distance range from reference mapping coordinates.

The pattern verification unit 930 verifies whether similarity between a reference input pattern and an authentication target input pattern falls within a preset similarity range.

The fingerprint verification unit 940 verifies whether the similarity between reference fingerprint information and authentication target fingerprint information falls within a preset similarity range.

Here, the combined authentication performance unit 830 shown in FIG. 8 may determine that combined authentication has succeeded when all of character verification, coordinate verification, pattern verification, and fingerprint verification are successful.

Further, the combined authentication performance unit 830 shown in FIG. 8 may determine that combined authentication has failed when any one of character verification, coordinate verification, pattern verification, and fingerprint verification is not successful.

Although not shown in FIG. 9, the combined authentication performance unit 830 shown in FIG. 8 may also determine that combined authentication has succeeded if two or more of, or three or more of character verification, coordinate verification, pattern verification, and fingerprint verification are successful.

Figure 10:
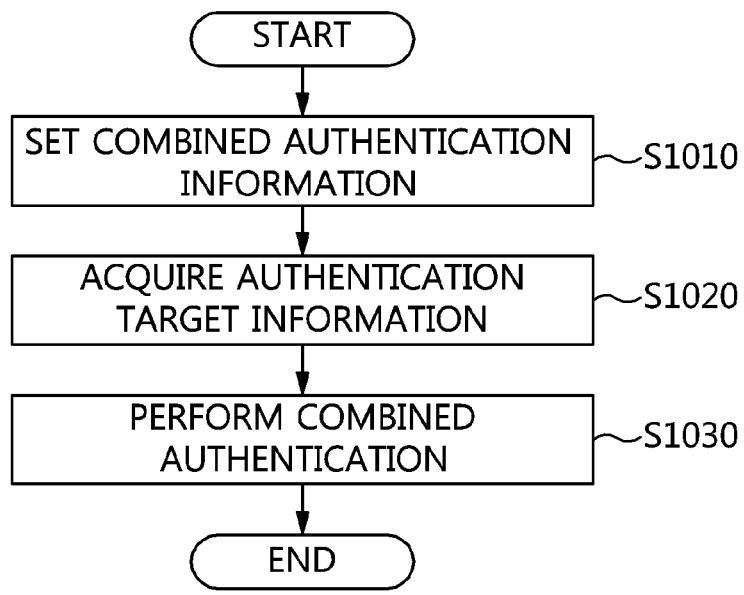
FIG. 10 is an operation flowchart showing a method for providing a combined authentication service according to another embodiment of the present invention.

FIG. 10 is an operation flowchart showing a method for providing a combined authentication service according to another embodiment of the present invention.

Referring to FIG. 10, the method for providing a combined authentication service according to another embodiment of the present invention acquires a coordinate mapping layer region, reference characters, and reference coordinates from a user's entry, and then sets combined authentication information at step S1010.

Here, the combined authentication information may include one or more of a coordinate mapping layer region, reference characters, reference coordinates, and reference mapping coordinates.

At step S1010, as a region separate from a character entry region including a character entry keypad when the user makes a region setting entry, a coordinate mapping layer region may be acquired.

At step S1010, reference characters and reference coordinates may be acquired via the character entry region when the user makes a character setting entry, and reference mapping coordinates may be calculated by mapping the reference coordinates to the coordinate mapping layer region.

At step S1010, a mapping relationship may be generated such that coordinates in the coordinate mapping layer region are mapped in a one-to-one mapping manner to coordinates in the character entry region, and the reference coordinates may be mapped depending on the mapping relationship.

At step S1010, when the user selects any one from among preset coordinate mapping layer region types, the coordinate mapping layer region may be acquired depending on the selected type.

Here, the user may select any one from among the coordinate mapping layer region types displayed on the display of his or her terminal device.

For example, at step S1010, when the user selects one type, the apparatus for providing a combined authentication service according to the present invention may acquire, as the coordinate mapping layer region, a region specified based on base lines (0%) corresponding to the left and top edges of the display so that the region conforms to the corresponding type.

Further, at step S1010, as another method of acquiring a coordinate mapping layer region, when one type is displayed and the user moves the region of the type, the coordinate mapping layer region based on the results of movement may be acquired.

Furthermore, at step S1010, as a further method of acquiring a coordinate mapping layer region, when one type is displayed and the user adjusts the size of the region of the type, a size-adjusted coordinate mapping layer region may be acquired.

At step S1010, when the user makes a character setting entry, a reference input pattern may be additionally acquired.

The reference input pattern may include the entry times of reference characters when the user makes a character setting entry.

The reference input pattern may include time intervals between the entry times of the reference characters.

The reference input pattern may be the ratio of the time intervals between the entry times of the reference characters.

Here, at step S1010, the user's reference fingerprint information may be additionally acquired when the user makes a character setting entry.

Further, the method for providing a combined authentication service according to the embodiment of the present invention acquires authentication target characters and authentication target coordinates, which are to be authenticated, via the character entry region when the user makes an authentication entry at step S1020.

At step S1020, an authentication target input pattern may be additionally acquired when the user makes an authentication entry.

The authentication target input pattern may include the entry times of authentication target characters when the user makes an authentication entry.

The authentication target input pattern may include time intervals between the entry times of the authentication target characters.

The authentication target input pattern may be the ratio of the time intervals between the entry times of the authentication target characters.

Here, at step S1020, the authentication target fingerprint information of the user may be additionally acquired when the user makes an authentication entry.

In this case, the method for providing a combined authentication service according to the embodiment of the present invention may display an entry state indication line for indicating whether each character has been entered on the display of the terminal device.

Here, on the entry state indication line, one or more entry marks may be arranged so as to indicate the number of entered characters and the intervals between the entry times of the characters whenever the user enters each character.

For example, when the user enters numbers in the sequence of 6, 4, 8, and 1, an entry mark is generated on the entry state indication line whenever the user enters each number, and thus a total of four entry marks may be arranged.

Here, when the user enters numbers of 6, 4, 8, and 1 at regular time intervals, the arrangement intervals between the entry marks may be uniform.

Further, when the user enters numbers in the sequence of 6, 4, 8, and 1, and shortens a time interval between the entry times of 4 and 8, the arrangement interval between the entry marks of 4 and 8 may be shorter than that of other entry marks.

For example, when the user enters numbers in the sequence of 6, 4, 8, and 1 at times of 0 ms (base value), 300 ms, 400 ms, and 600 ms, respectively, the ratio of the arrangement intervals between the entry marks may be 3:1:2 depending on the ratio of entry time intervals.

Further, the method for providing a combined authentication service according to the present invention performs combined authentication by verifying authentication target characters and authentication target mapping coordinates at step S1030.

Here, step S1030 may include the step of verifying whether the authentication target characters match reference characters contained in combined authentication information.

Step S1030 may further include the step of verifying whether the authentication target mapping coordinates fall within a preset distance range from reference mapping coordinates.

Step S1030 may further include the step of verifying whether similarity between the reference input pattern and the authentication target input pattern falls within a preset similarity range.

Step S1030 may further include the step of verifying whether similarity between the reference fingerprint information and the authentication target fingerprint information falls within a preset similarity range.

Figure 11:
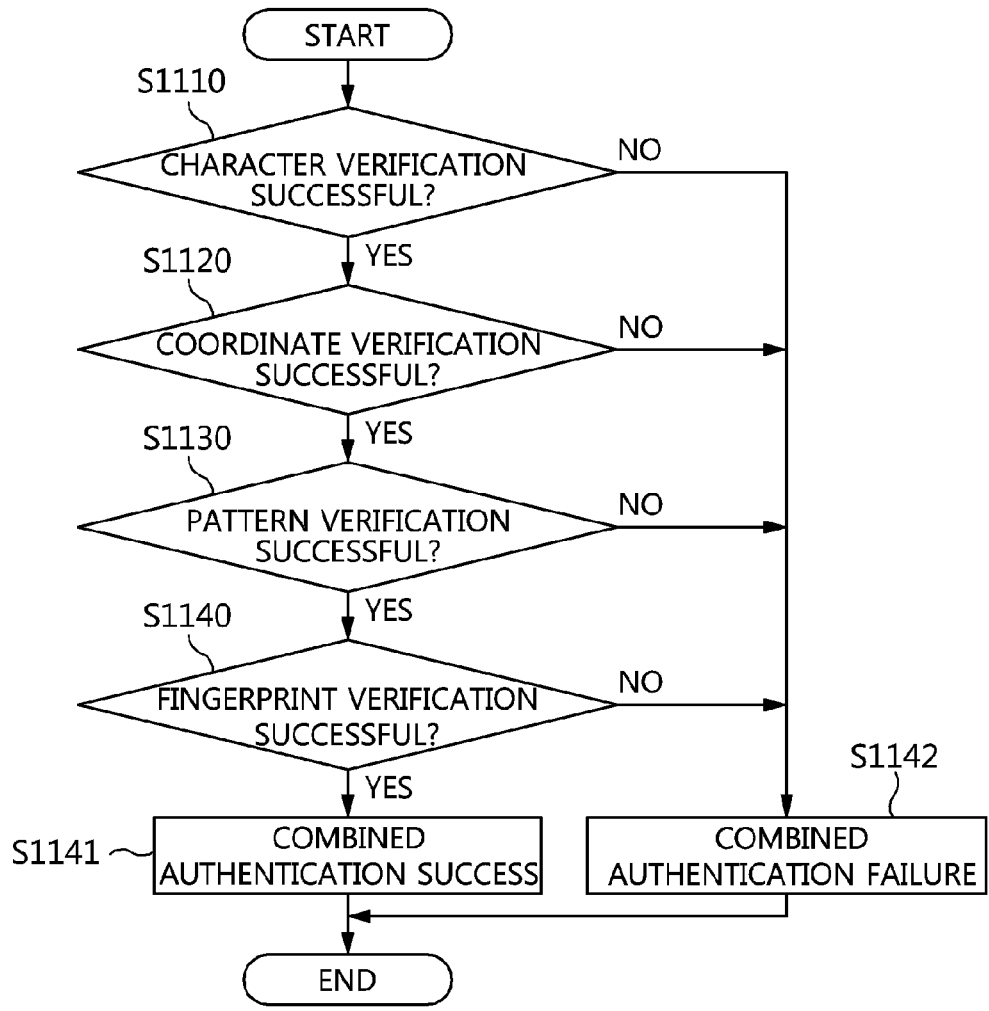
FIG. 11 is an operation flowchart showing an example of a combined authentication performance step according to the other embodiment of the present invention.

FIG. 11 is an operation flowchart showing an example of combined authentication performance step S1030 according to the other embodiment of the present invention.

FIG. 11 illustrates an example in which, when all of character verification, coordinate verification, pattern verification, and fingerprint verification are successful, it is determined that combined authentication has succeeded. Although not shown in FIG. 11, the combined authentication performance step S1030 according to the present invention may be configured to determine that combined authentication has succeeded even when two or more of, or three or more of character verification, coordinate verification, pattern verification, and fingerprint verification are successful.

Referring to FIG. 11, the combined authentication performance step S1030 according to the present invention is configured to verify whether the authentication target characters match the reference characters contained in the combined authentication information at step S1110.

As a result of verification at step S1110, when the authentication target characters match the reference characters, the combined authentication performance step S1030 according to the present invention proceeds to step S1120.

Further, the combined authentication performance step S1030 according to the present invention is configured to verify whether the authentication target mapping coordinates fall within a preset distance range from the reference mapping coordinates at step S1120.

As a result of the verification at S1120, if the authentication target mapping coordinates fall within the preset distance range, the combined authentication performance step S1030 according to the present invention proceeds to step S1130.

Further, the combined authentication performance step S1030 according to the present invention is configured to verify whether the similarity between the reference input pattern and the authentication target input pattern falls within a preset similarity range at step S1130.

As a result of the verification at step S1130, if the similarity between the authentication target input pattern and the reference input pattern falls within the preset similarity range, the combined authentication performance step S1030 according to the present invention proceeds to step S1140.

Furthermore, the combined authentication performance step S1030 according to the present invention is configured to verify whether the similarity between the reference fingerprint information and the authentication target fingerprint information falls within a preset similarity range at step S1140.

At the combined authentication performance step S1030 according to the present invention, if the similarity between the reference fingerprint information and the authentication target fingerprint information falls within the preset similarity range, it is determined that combined authentication has succeeded at step S1141.

In contrast, as a result of the verification at steps S1110, S1120, S1130, and S1140, if the authentication target characters do not match the reference characters, if the authentication target mapping coordinates do not fall within the preset distance range, if the similarity between the authentication target input pattern and the reference input pattern does not fall within the preset similarity range, or if the similarity between the reference fingerprint information and the authentication target fingerprint information does not fall within the preset similarity range, the combined authentication performance step S1030 according to the present invention is configured to determine that combined authentication has failed at step S1142.

Although not shown in FIG. 11, an example of the case where it is determined at the combined authentication performance step S1030 according to the present invention that combined authentication has succeeded when two or more of character verification, coordinate verification, pattern verification, and fingerprint verification are successful will be described below.

In this case, step S1030 may further include the additional step of determining the number of verification successes after all of character verification (S1110), coordinate verification (S1120), pattern verification (S1130), and fingerprint verification (S1140) have been performed. Here, when the number of verification successes is two or more, it may be determined that combined authentication has succeeded.

As another example, step S1030 may further include the step of randomly performing character verification (S1110), coordinate verification (S1120), pattern verification (S1130), and fingerprint verification (S1140), and summing the number of verification failures after respective verification procedures have been performed. Here, when three or more of the verification procedures have failed, the remaining verification is no longer performed, and it may be determined that combined authentication has failed.

The method for providing a combined authentication service according to the present invention may be implemented as a program or a smartphone app that can be executed by various computer means. In this case, the program or smartphone app may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, for example, magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

Figure 12:
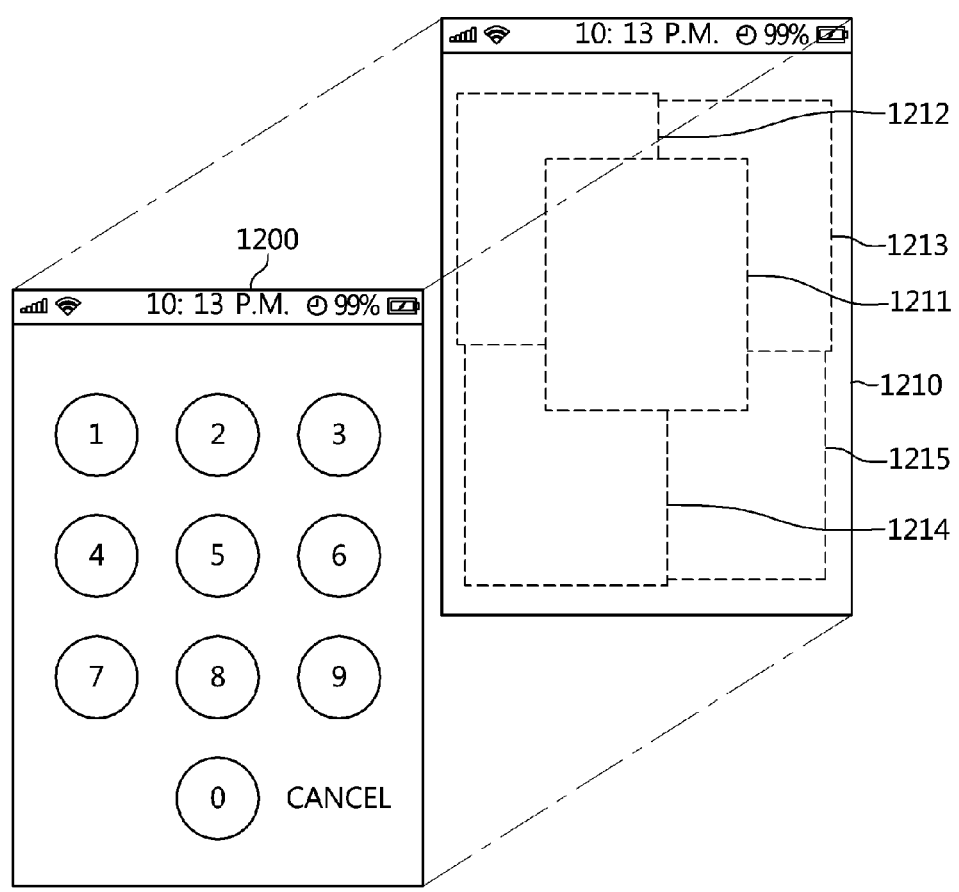
FIG. 12 is a diagram showing an example of an interface screen according to the other embodiment of the present invention.

FIG. 12 is a diagram showing an example of an interface screen according to the other embodiment of the present invention.

In particular, the interface screen of FIG. 12 is a screen on which a user selects any one from among preset coordinate mapping layer region types and sets a coordinate mapping layer region.

Referring to FIG. 12, the apparatus for providing a combined authentication service according to the present invention displays preset coordinate mapping layer region types to the user so as to set coordinate mapping layer regions as a region separate from a character entry region allowing the user to enter characters.

Here, the user may select one type from among coordinate mapping layer region types 1211 to 1215 displayed on the display 1200 of his or her terminal device.

The apparatus for providing a combined authentication service according to the present invention may acquire the coordinate mapping layer region corresponding to the type selected by the user and set the combined authentication information containing the coordinate mapping layer region.

For example, when the user selects type 1215, the apparatus for providing a combined authentication service according to the present invention may acquire, as the coordinate mapping layer region, a region located rightwards by 40%~100% from a left edge (0%) and downwards by 40%~100% from a top edge (0%) on the display 1200 so that the region conforms to the type 1215.

Although not shown in FIG. 12, the apparatus for providing a combined authentication service according to the present invention is configured to, when one type 1211 is displayed and the user moves the region of the type 1211, acquire the coordinate mapping layer region based on the results of movement and set the combined authentication information containing the coordinate mapping layer region.

For example, when the region of the type 1211 is configured to be located rightwards by 20%~80% from the left edge (0%) and downwards by 20%~80% from the top edge (0%), and the user moves the region of the type 1211 rightwards by 10%, the region located rightwards by 10%~90% from the left edge (0%) and downwards by 20%~80% from the top edge (0%) on the display 1200 may be acquired as the coordinate mapping layer region so as to conform to the results of movement.

Figure 13:
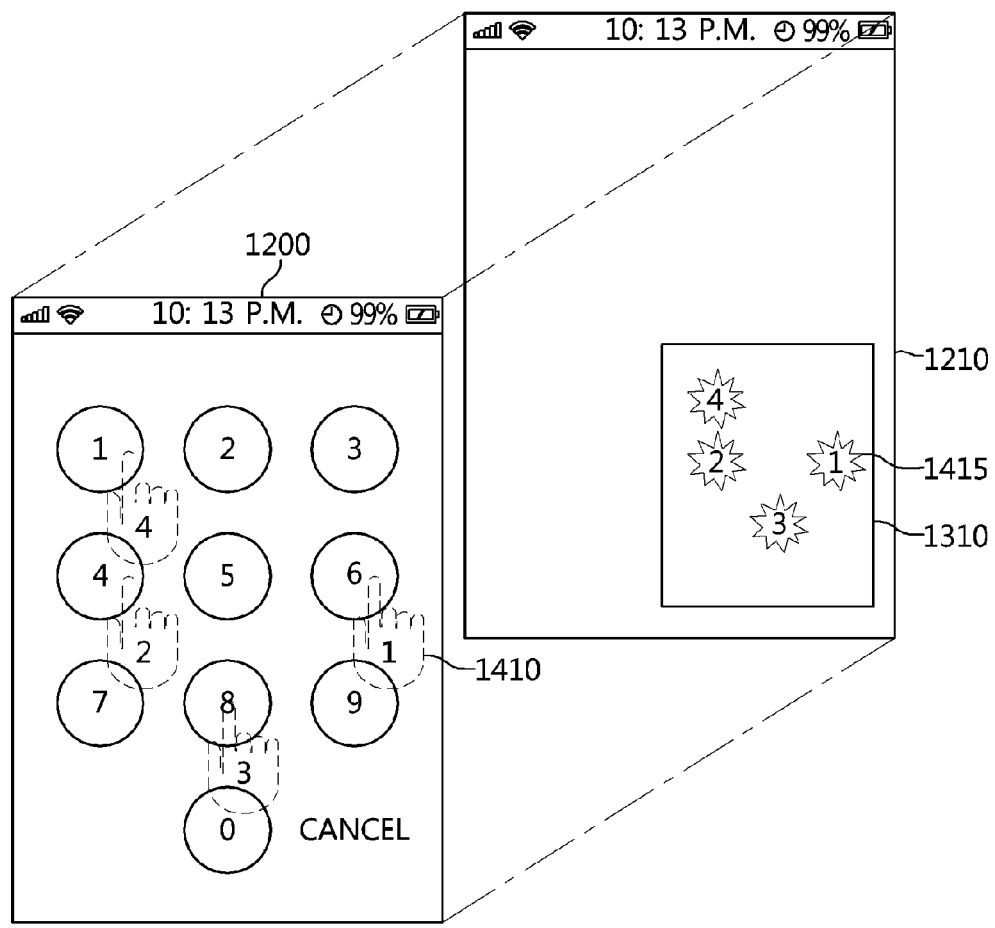
FIG. 13 is a diagram showing another example of the interface screen according to the other embodiment of the present invention.

FIG. 13 is a diagram showing another example of the interface screen according to the other embodiment of the present invention.

In particular, the interface screen of FIG. 13 is a screen on which a coordinate mapping layer region type is selected, and then the coordinates entered by the user are mapped to the coordinates in a layer region 1310 depending on a mapping relationship generated such that the coordinates in the coordinate mapping layer region are mapped to the coordinates in the character entry region in a one-to-one mapping manner. Here, the layer region 1310 may not be separately displayed to the user, wherein the user may enter characters while viewing only an existing character entry region.

Referring to FIG. 13, the apparatus for providing a combined authentication service according to the present invention displays an existing character entry region on the display 1200 of the terminal device.

When the user enters characters using an entry tool 1410, the coordinates entered by the user are mapped to coordinates in the layer region 1310 depending on a mapping relationship generated such that the coordinates in the character entry region are mapped to coordinates in the layer region in a one-to-one mapping manner (1415).

For example, when the range of the character entry region on the terminal device is 600×800, and the range of the layer region 1310 is a region of 360×480 corresponding to the lower right portion of the character entry region, the mapping relationship may be x'=600−(600−x)*0.6 and y'=y*0.6. Here, x and y may be components of the authentication target coordinates entered by the user, and x' and y' are the components of the mapped coordinates. Depending on such a mapping relationship, when the authentication target coordinates are x=500 and y=400, the mapped coordinates are x=540 and y=240.

Figure 14:
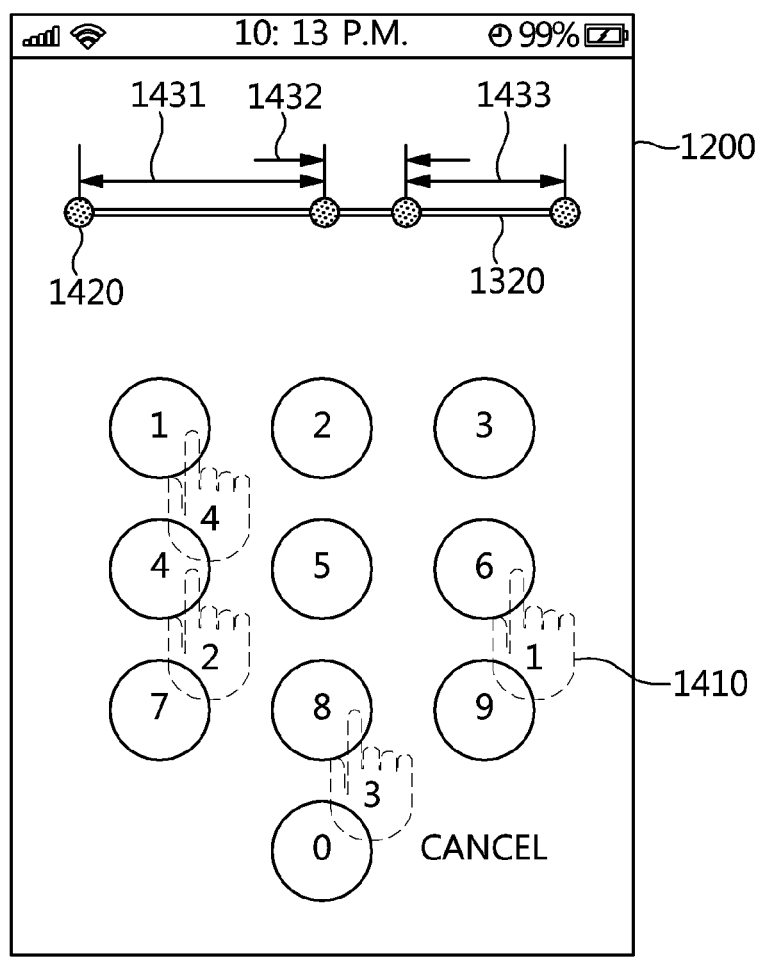
FIG. 14 is a diagram showing a further example of the interface screen according to the other embodiment of the present invention.

FIG. 14 is a diagram showing a further embodiment of the interface screen according to the other embodiment of the present invention.

In particular, the interface screen of FIG. 14 is a screen on which intervals between entry times based on the entry of the user are displayed using the arrangement intervals between entry marks 1420.

Referring to FIG. 14, when the user enters authentication target characters using an entry tool 1410, the entry marks 1420 are arranged on an entry state indication line 1320 in consideration of the intervals between the entry times of the authentication target characters.

For example, when the user numbers in the sequence of 6, 4, 8, and 1, the entry marks 1420 are generated on the entry state indication line 1320 whenever respective numbers are entered, and thus a total of four entry marks 1420 are arranged.

Here, when the user enters numbers of 6, 4, 8, and 1 at regular time intervals, the arrangement intervals 1431 to 1433 between the entry marks 1420 are uniform.

Further, when the user enters numbers in the sequence of 6, 4, 8, and 1, and shortens the time interval between the entry times of 4 and 8, the arrangement interval 1432 between the entry marks corresponding to 4 and 8 becomes shorter than the arrangement intervals 1431 and 1433 between other entry marks.

For example, when the user enters numbers in the sequence of 6, 4, 8, and 1 at times of 0 ms (base value), 300 ms, 400 ms, and 600 ms, respectively, the ratio of the arrangement intervals 1431 to 1433 between the entry marks may be 3:1:2 depending on the ratio of the entry time intervals.

As described above, the ratio between the entry time intervals is displayed by means of on the arrangement intervals between the entry marks, thus allowing the user to intuitively display the shape of the pattern.

In accordance with the present invention, it is possible to provide a security-strengthened authentication service while allowing a user to maintains his or her existing password without change, by performing authentication in consideration of entered numbers and entry coordinates when the user selects the location of a password entry window and enters his or her password into the entry window at the selected location.

Further, it is possible to provide a security-strengthened authentication service while allowing a user to maintain his or her existing password and existing password entry window without change, by performing authentication in consideration of a region to be mapped and an entered password when the user selects a region to which password entry coordinates are to be mapped upon setting the password.

Furthermore, the present invention may provide a security-strengthened authentication service while allowing a user to maintaining his or her existing password without change, by performing authentication such that, when the user sets a password, a password input pattern is set and such that, when the password is entered, the password input pattern is considered or fingerprint information is additionally considered.

As described above, in the method and apparatus for providing a combined authentication service according to the present invention, the configurations and schemes in the above-described embodiments are not limitedly applied, and some or all of the above embodiments can be selectively combined and configured so that various modifications are possible.

What is claimed is:

1. A method for providing a combined authentication service, comprising:
   setting combined authentication information by acquiring an entry window location and authentication characters from a user;
   displaying an entry window including an entry keypad at the entry window location and acquiring entry information including entry characters and entry coordinates from the user via the entry window; and
   performing combined authentication by verifying the entry characters and the entry coordinates,
   wherein the setting the combined authentication information comprises:
      verifying whether the entry characters match authentication characters contained in the combined authentication information; and
      calculating an entry range in which the user makes an entry based on the entry coordinates, and verifying whether the entry range corresponds to the entry window location,
   wherein the setting combined authentication information further comprises:
      acquiring an input pattern of the authentication characters as an authentication character input pattern,
      acquiring an input pattern of the entry characters as an entry character input pattern, and wherein the performing combined authentication further comprises verifying whether similarity between the entry character input pattern and the authentication character input pattern falls within a preset similarity range, wherein, when the entry characters are acquired, the entry character input pattern includes times of entry of respective characters by the user, and wherein the entry character input pattern includes one of time intervals between the entry times and a ratio of the time intervals.

2. The method of claim 1, wherein setting the combined authentication information further comprises acquiring the entry window location depending on the selected location type in response to the user selecting one from among preset entry window location types.

3. The method of claim 2, wherein:

when the authentication characters are acquired, the authentication character input pattern includes times of entry of respective characters by the user.

4. An apparatus for providing a combined authentication service, comprising:

a user interface unit configured to display an entry window including an entry keypad at an entry window location and configured to acquire entry information including entry characters and entry coordinates from a user via the entry window; and a processor comprising, a combined authentication information setting unit configured to set combined authentication information by acquiring the entry window location and authentication characters from the user a combined authentication performance unit configured to perform combined authentication by verifying the entry characters and the entry coordinates, wherein the combined authentication performance unit comprises, a character verification unit configured to verify whether the entry characters match authentication characters contained in the combined authentication information, and a coordinate verification unit configured to calculate an entry range in which the user makes an entry based on the entry coordinates, and verifying whether the entry range corresponds to the entry window location, wherein the combined authentication information setting unit is configured to acquire an input pattern of the authentication characters as an authentication character input pattern, the user interface unit is configured to acquire an input pattern of the entry characters as an entry character input pattern, and the combined authentication performance unit is configured to verify whether similarity between the entry character input pattern and the authentication character input pattern falls within a preset similarity range, wherein, when the entry characters are acquired, the entry character input pattern includes times of entry of respective characters by the user, and wherein the entry character input pattern includes one of time intervals between the entry times and a ratio of the time intervals.

5. The apparatus of claim 4, wherein the combined authentication information setting unit is configured to, when the user selects one from among preset entry window location types, acquire the entry window location depending on the selected type.

6. The apparatus of claim 5, wherein:

when the authentication characters are acquired, the authentication character input pattern includes times of entry of respective characters by the user.

7. An apparatus for providing a combined authentication service, the apparatus comprising a processor, wherein said processor comprises:

a combined authentication information setting unit configured to acquire a coordinate mapping layer region as a region separate from a character entry region including a character entry keypad when a user makes a region setting entry, acquire reference characters and reference coordinates via the character entry region when the user makes a character setting entry, and calculate reference mapping coordinates by mapping the reference coordinates to the coordinate mapping layer region and set combined authentication information;

an authentication target information acquisition unit configured to acquire authentication target characters and authentication target coordinates via the character entry region when the user makes an authentication entry; and a combined authentication performance unit configured to calculate authentication target mapping coordinates by mapping the authentication target coordinates to the coordinate mapping layer region, and verify the authentication target characters and the authentication target mapping coordinates and perform combined authentication, wherein the combined authentication performance unit comprises:

a character verification unit configured to verify whether the authentication target characters match the reference characters; and a coordinate verification unit configured to verify whether the authentication target mapping coordinates fall within a preset distance range from the reference mapping coordinates, wherein the combined authentication information setting unit is configured to acquire a reference input pattern when the user makes a character setting entry, the authentication target information acquisition unit is configured to acquire an authentication target input pattern when the user makes an authentication entry, and the combined authentication performance unit is configured to verify whether similarity between the reference input pattern and the authentication target input pattern falls within a preset similarity range, wherein the reference input pattern includes entry times of the reference characters when the user makes a character setting entry, and wherein the reference input pattern includes one of time intervals between the entry times of the reference characters and a ratio of the time intervals.

8. The apparatus of claim 7, wherein:

the combined authentication information setting unit is configured to generate a mapping relationship so that coordinates in the coordinate mapping layer region are mapped in a one-to-one mapping manner to coordinates in the character entry region, and map the reference coordinates depending on the mapping relationship, and the combined authentication performance unit is configured to map the authentication target coordinates depending on the mapping relationship.

9. The apparatus of claim 7, wherein the combined authentication information setting unit is configured to, when the user selects one from among preset coordinate mapping layer region types, acquire the coordinate mapping layer region depending on the selected type.

10. The apparatus of claim 9, wherein the authentication target input pattern includes entry times of the authentication target characters when the user makes an authentication entry, respectively.

11. The apparatus of claim 7, wherein:

the combined authentication information setting unit is configured to acquire reference fingerprint information of the user when the user makes a character setting entry, the authentication target information acquisition unit is configured to acquire authentication target fingerprint information of the user when the user makes an authentication entry, and the combined authentication performance unit is configured to verify whether similarity between the reference fingerprint information and the authentication target fingerprint information falls within a preset similarity range.

* * * * *